I. M. PHELPS.
Amalgamator.
No. 198,904. Patented Jan. 1, 1878.
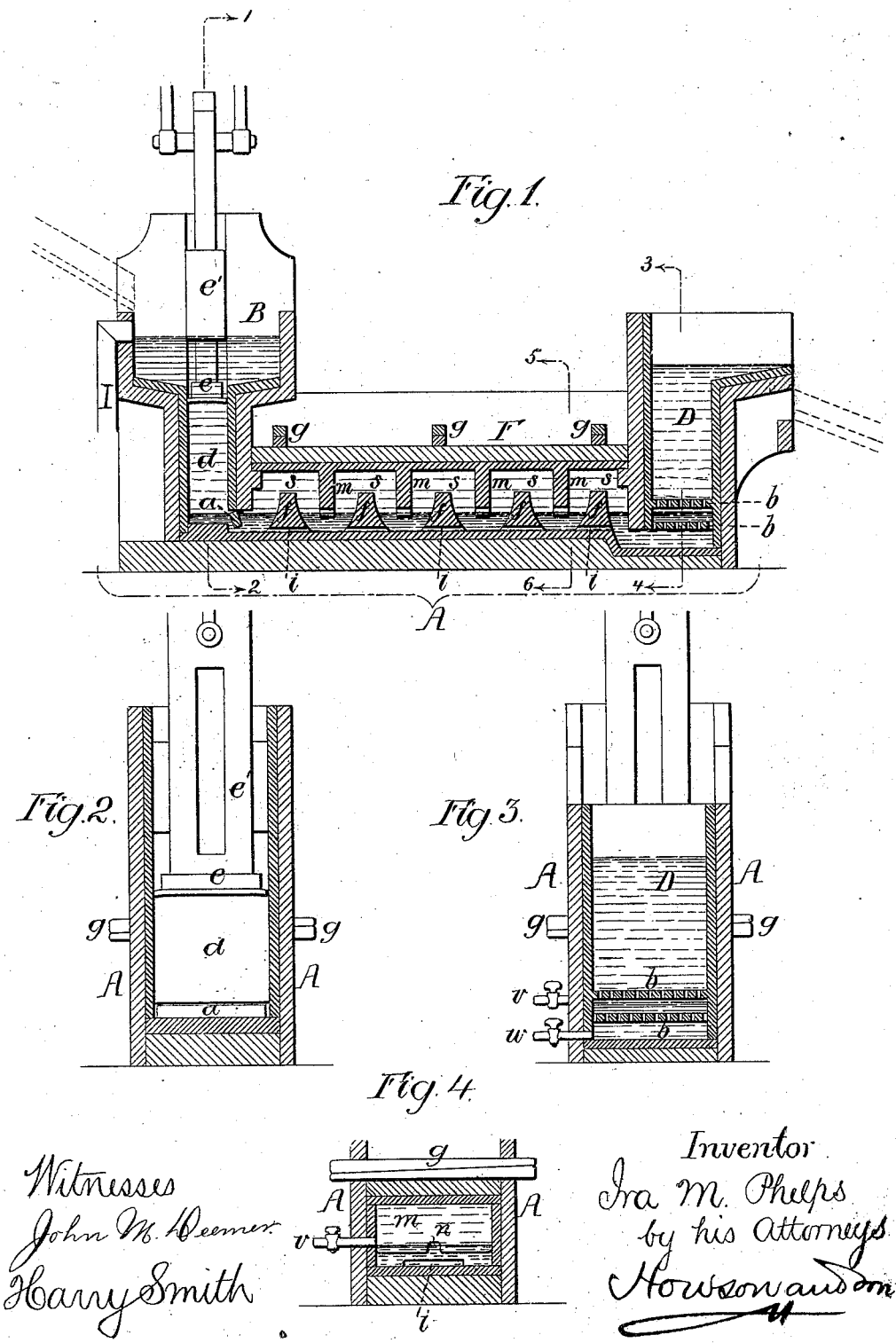

UNITED STATES PATENT OFFICE.

IRA M. PHELPS, OF PHILADELPHIA, PENNSYLVANIA, ASSIGNOR OF A PART OF HIS RIGHT TO THEODORE L. CHASE AND H. J. FILLMAN, OF SAME PLACE, AND D. K. ALLEN, OF BOSTON, MASSACHUSETTS.

IMPROVEMENT IN AMALGAMATORS.

Specification forming part of Letters Patent No. 198,904, dated January 1, 1878; application filed November 8, 1877.

*To all whom it may concern:*

Be it known that I, IRA M. PHELPS, of Philadelphia, Pennsylvania, have invented a new and useful Improvement in Amalgamators or Separators for Treating Gold and Silver Ores, of which the following is a specification:

The object of my invention is to so treat gold or silver bearing ores that the gangue will be separated from the valuable particles and carried off—an object which I attain in the manner hereinafter set forth, reference being had to the accompanying drawing, in which—

Figure 1 is a longitudinal vertical section of my improved separating apparatus; and Figs. 2, 3, and 4, transverse sections on the lines 1 2, 3 4, and 5 6, respectively.

A represents a box or casing, enlarged at each end, so as to form two reservoirs, B and D, the former communicating with the body of the box through an opening provided with a check-valve, $a$, and the reservoir D communicating with said body through an opening, immediately adjacent to which, and within the reservoir, are arranged two perforated plates or screens, $b\ b$, placed one above the other.

The lower portion of the reservoir B is contracted in size, so as to form a pump-barrel, $d$, to which is adapted a plunger, $e$, carried by a guided stem, $e'$, a vertical reciprocating movement being imparted to the latter by any suitable mechanism.

Extending transversely across the body of the box A is a series of bridge-bars, $f$, through which extend passages $i$, for a purpose hereinafter explained.

The body of the box A has a lid, F, held in place by transverse bars or keys $g$, which can be readily withdrawn when it is desired to remove the lid, the latter being provided with downwardly-projecting ribs $m$, which occupy positions between the bridge-bars $f$, and are each provided with one or more slots, $n$, at the lower edge. (See Fig. 4.)

In preparing the apparatus for operation, mercury is poured into the box A until it reaches the level indicated in Fig. 1, so as to form within the body of the box a number of chambers, $s$, separated by partitions $m$, the lower ends of which extend down into the mercury, as shown.

The pulverized ore, mixed with water, is introduced in a continuous stream into the reservoir B, and, the pump being put into operation, volumes of this mixture are forced through the box A, passing from chamber to chamber, and at each such passage are compelled to pass under the lower edge of one of the partitions $m$, being thus brought into intimate contact with successive volumes of the mercury.

If the ore has not been previously treated in an amalgamating apparatus, the liquid mercury will serve to amalgamate the valuable metals in the ore, while, if these valuable metals have been previously amalgamated, the mercury will serve to retain the amalgam and free mercury carried by the mixture which is forced through the box A, so that in either case the water escaping from the reservoir D carries with it merely the gangue, all the valuable matter being retained by the mercury.

The perforated partitions $b\ b$ occupy space in the lower portion of the reservoir D which would otherwise have to be filled with mercury; and these partitions furthermore serve to divide the ascending volume of ore and water, and also the mercury raised by the same, into a number of jets, which are intimately commingled with each other.

When from any cause the pump is stopped, it is advisable to draw off the mixture of ore and water from the chambers $s$ and reservoir B; otherwise sediment will collect on the surface of the mercury, and will become hard and compact, thereby interfering with the operation of the apparatus when the pump is again put in motion. In order to effect this operation, the box A is provided with a cock or faucet, $v$, arranged at or about the level of the mercury in the same, so that as the chambers $s$ communicate with each other through the slots $n$, and with the reservoir B through the valve $a$, the opening of the said cock or faucet will suffice to permit the entire volume of mixed ore and water to pass off into a suitable receptacle, from which it may be returned to the reservoir B when the apparatus is again put in operation.

The slots $n$ may be dispensed with if the faucet $v$ is placed at such a height that when open it will permit the discharge of a quantity of the mercury, so that the chambers $s$ can communicate with each other below the edges of the partitions $m$, the mercury, of course, being returned to the box prior to the starting of the apparatus.

The drawing off of the mercury from the box A is effected through a faucet, $w$; and in order to effect the complete withdrawal of every portion of the mercury, the bottom of that end of the box A with which the faucet $w$ communicates is depressed below the level of the bottom of the main portion, as shown in Fig. 1.

Another object of thus depressing the bottom of the box at this point is to obtain, without raising the level of the mercury in the body of the box, a considerable volume of mercury, through which the mixture of ore and water is forced before reaching the point of final discharge.

In order to prevent the overflow of the reservoir B in case the mill stops and water still continues to run into said reservoir, the latter is provided with an overflow-pipe, I, which discharges into a receptacle suitably located.

The object of the passages $i$ is to insure the maintenance of the mercury at the same level throughout the entire box A, and thus prevent any interference with the proper operation of the apparatus which might otherwise be caused by the carriage of mercury from one chamber to another.

It should be understood that the box A, reservoirs B and D, bridge-bars $f$, ribs $m$, screens $b$—in fact all parts of the apparatus with which the mixture of ore and water is brought into contact—are composed of or lined with material (such as wood or glass) which will not be injuriously affected by the sulphuric acid with which the mixture is more or less impregnated when the ore has been roasted.

I claim as my invention—

1. The combination of the box A and the bridge-bars $f$ in the same with the ribs $m$, carried by a removable cover, F, as specified.

2. The combination of the box A, having ribs or partitions $m$ extending below the level of the mercury in the box, with the bridge-bars $f$, having passages $i$ through the same, as and for the purpose set forth.

3. The box A, having a series of amalgamating or separating chambers, $s$, and having a depression at and near the discharge end, as and for the purpose described, In testimony whereof I have signed my name to this specification in the presence of two subscribing witnesses.

IRA M. PHELPS.

Witnesses:
RICHARD L. GARDINER,
HARRY SMITH.